US006788476B2

(12) United States Patent
Schöppach et al.

(10) Patent No.: US 6,788,476 B2
(45) Date of Patent: Sep. 7, 2004

(54) OPTICAL BENCH

(75) Inventors: Armin Schöppach, Aalen (DE); Paul Kaufmann, Aalen (DE); Hartmut Münker, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 10/097,898

(22) Filed: Mar. 13, 2002

(65) Prior Publication Data

US 2002/0191308 A1 Dec. 19, 2002

Related U.S. Application Data

(63) Continuation-in-part of application No. PCT/EP00/08482, filed on Aug. 31, 2000.

(30) Foreign Application Priority Data

Sep. 13, 1999 (DE) .......................................... 199 43 870

(51) Int. Cl.⁷ ................................................ G02B 7/02
(52) U.S. Cl. ........................ 359/819; 359/820; 359/822
(58) Field of Search .................................. 359/694, 819, 359/820, 811, 821, 822

(56) References Cited

U.S. PATENT DOCUMENTS

| 3,758,217 A | * | 9/1973 | Stokstad ...................... 359/819 |
| 5,530,547 A | | 6/1996 | Arnold ........................ 356/354 |
| 5,781,355 A | | 7/1998 | Meier .......................... 359/871 |
| 5,828,502 A | * | 10/1998 | Afshari ....................... 359/819 |
| 5,841,592 A | * | 11/1998 | Herren et al. ............... 359/819 |

FOREIGN PATENT DOCUMENTS

| DE | 32 46 358 A1 | 12/1982 | ............ G12B/5/00 |
| EP | 0 844 473 A1 | 5/1998 | .......... G01M/11/04 |

* cited by examiner

*Primary Examiner*—Georgia Epps
*Assistant Examiner*—M. Hasan

(57) ABSTRACT

The invention relates to an optical bench that has a base plate and can be permanently connected to an associated component. A receiving element for other optical elements that is arranged in such a way in relation to the base plate with connecting elements that it is deformable in its entirety in relation to said base plate, is allocated to the same.

58 Claims, 2 Drawing Sheets

OPTICAL BENCH

CROSS-REFERENCES TO RELATED APPLICATIONS

This is a Continuation in part to International Application PCT/EP00/08482, filed Aug. 31, 2000.

STATEMENT REGARDING FEDERALLY SPONSORED RESEARCH OR DEVELOPMENT

Not applicable.

BACKGROUND OF THE INVENTION

A mounting for a mirror is known from U.S. Pat. No. 5,781,355 and German Patent Document DE 296 03 024 U1. This mounting has a baseplate that is connected to a mirror support via an compensating structure. This compensating structure is a filigree structure with hinges which are articulated with middle portions by means of rods, the baseplate and the support plate being connected to the same by means of rods arranged perpendicularly to the compensating structures arranged parallel to the baseplate and support plate. The compensating structures are preferably of aluminum and compensate the different thermal expansions of the baseplate and support plate by elastic deformation.

A device for play-free vertical displacement of objects is known from German Patent Document DE 32 46 358 A1. This device has plates that are arranged approximately mutually parallel, and are respectively connected to each other by a monolithic hinge. Furthermore, the second and third plates are provided with a respective screw passing through the plate and are supported on the respective underlying plate. The respective plate is supported on the underlying plate by the respective screw and the monolithic hinge. A desired tilt angle of the respective plate can be set by rotation of the screw. A notch is provided in the uppermost plate to receive the object to be displaced.

TECHNICAL FIELD

The invention relates to an optical bench according to the preamble of claim 1. An optical bench which has a baseplate is known from European Patent Document EP 844 473 A1. This baseplate is provided with seatings which are connected to associated optical units. The axes of the optical units are mutually parallel and perpendicular to the baseplate of the optical bench.

It is disadvantageous in this optical bench that due to the perpendicular arrangement of the axes of the optical units to the baseplate, this bench structure takes up a great deal of space. It is furthermore disadvantageous that stresses arise due to temperature fluctuations or due to a temperature gradient arising in the baseplate, due to the adjacent arrangement of seatings and baseplate, so that the deformations resulting from the stresses are transmitted to the adjacently arranged seatings.

Furthermore, the invention had as its object to provide an optical bench which is of compact construction.

Furthermore, the invention had as its object to provide an optical bench in which the effect of thermal fluctuations on the relative arrangement of the optical units to one another is prevented.

SUMMARY OF THE INVENTION

The object of the invention is attained by means of the features given in claim 1. By means of the measure of providing an optical bench with a baseplate which has a seating which can be arranged, by means of associated connecting elements, with respect to the baseplate, movable in its entirety relatively to the same, in which stresses arising in the baseplate are not transmitted, or are transmitted at least only in a slight degree, to the seatings. The stresses are transformed into a deformation of the baseplate relative to the seating. These stresses thereby do not act on the seating, so that the relative arrangement of the optical units mounted on the seating does not change.

It has been found to be advantageous to provide the relative deformation of the seating element and the baseplate by means of connecting elements which preferably comprise springs. As springs, leaf springs have been found to be particularly suitable.

However, connecting elements which include articulations could also be provided. These articulations are to permit a movement of the baseplate relative to the seating only by the action of a predetermined minimum force, so that the transmission of vibrations from the baseplate to the seating is prevented.

It has been found to be advantageous to provide as the seating, a monolithic member which is constituted with inner bores for beam guiding. High shape stability and a homogeneous temperature distribution are attainable by the use of a monolithic member.

Furthermore, it has been found to be advantageous to provide for the seating a housing-like hollow member with apertures for the coupling-on of optical units. The weight can be reduced by the provision of a housing-like hollow member as the seating. The use of a multi-part housing-like seating can also have an advantageous effect as regards production costs, particularly material costs, since the seating is thus not to be produced from a massive block of material.

It has been found to be advantageous that the seating has a material which has a high ratio of thermal conductivity to thermal expansion coefficient. The formation of a temperature gradient in the receiver, which could result in stresses and a deformation of the seating, is opposed by a high thermal conductivity. The changes in dimensions resulting from temperature fluctuations are small because of a small thermal expansion coefficient, so that the relative arrangement of the optical units connected to the seating changes little, if at all. Deformations due to a temperature gradient often cause a distortion of the respective component. A loss of the initially existing parallelism results from a distortion and can have serious effects on an optical system. In particular, a distortion of the seating is particularly critical for this reason.

A ceramic material, preferably Zerodur, has been found to be particularly advantageous for the seating. With a compact constitution of the seating, the seating can be resistant against launching loads because of its dimensions, so that a ceramic can be used as the material for the seating, ensuring an acceptable life of the seating.

It has been found to be advantageous to make the baseplate at least partially of a metal, in order to be able to ensure a resistance to high launching loads, if the use of the optical bench in a satellite system is planned. In particular, the greater dimensions of the baseplate as compared with the seating demand greater stability because of this effective launching load.

It has been found to be advantageous to make the baseplate triangular with a centrally arranged perforation and flange segments, so that the baseplate can be securely connected to an associated component by means of the flange segments; in particular, the optical bench can be secured by means of the flange segments to the optical head of an associated satellite. The constitution of the baseplate in a triangular shape is advantageous in reducing its own weight.

It has been found to be advantageous to constitute the baseplate for the formation of a mounting structure with reinforcements, which are preferably in the form of ribs, the baseplate having support points for coupling a telescope to it. Such a mounting structure can be constituted in one piece, particularly of aluminum for weight reduction.

To ensure a uniform temperature distribution within the seating, the connecting elements have a cross section which is predetermined in dependence on its thermal conductivity, to provide a predetermined thermal coupling between the baseplate and seating. When the seating is heated on one side, a heat accumulation is opposed by the slight removal of heat over the connecting elements, and the formation of a temperature gradient is opposed due to the high thermal conductivity of the material of the seating.

It has been found to be advantageous to provide in addition a heat conducting strip which serves to remove heat to prevent overheating, particularly of the optical elements, at least at a temperature of the seating exceeding a predetermined temperature threshold.

It has been found to be advantageous to connect the receiving unit and the transmitting unit securely to the seating, so that these two optical elements, reacting sensitively to relative position changes, are mounted by means of the seating and are thus decoupled from deformations of the baseplate.

It has been found to be advantageous to provide the baseplate with a connection for an optical unit, preferably with mounting points for the seating of a deflecting mirror. By a deflecting mirror, which is preferably adjustable for the adjustment of the incident beam, direction changes of the same can be compensated. Thus the deflecting mirror can be mounted on a component which undergoes large deformations due to temperature fluctuations. Further advantageous measures are described in further dependent claims. The invention is described in detail hereinafter using an embodiment example.

DETAILED DESCRIPTION OF THE INVENTION

Figure 1:
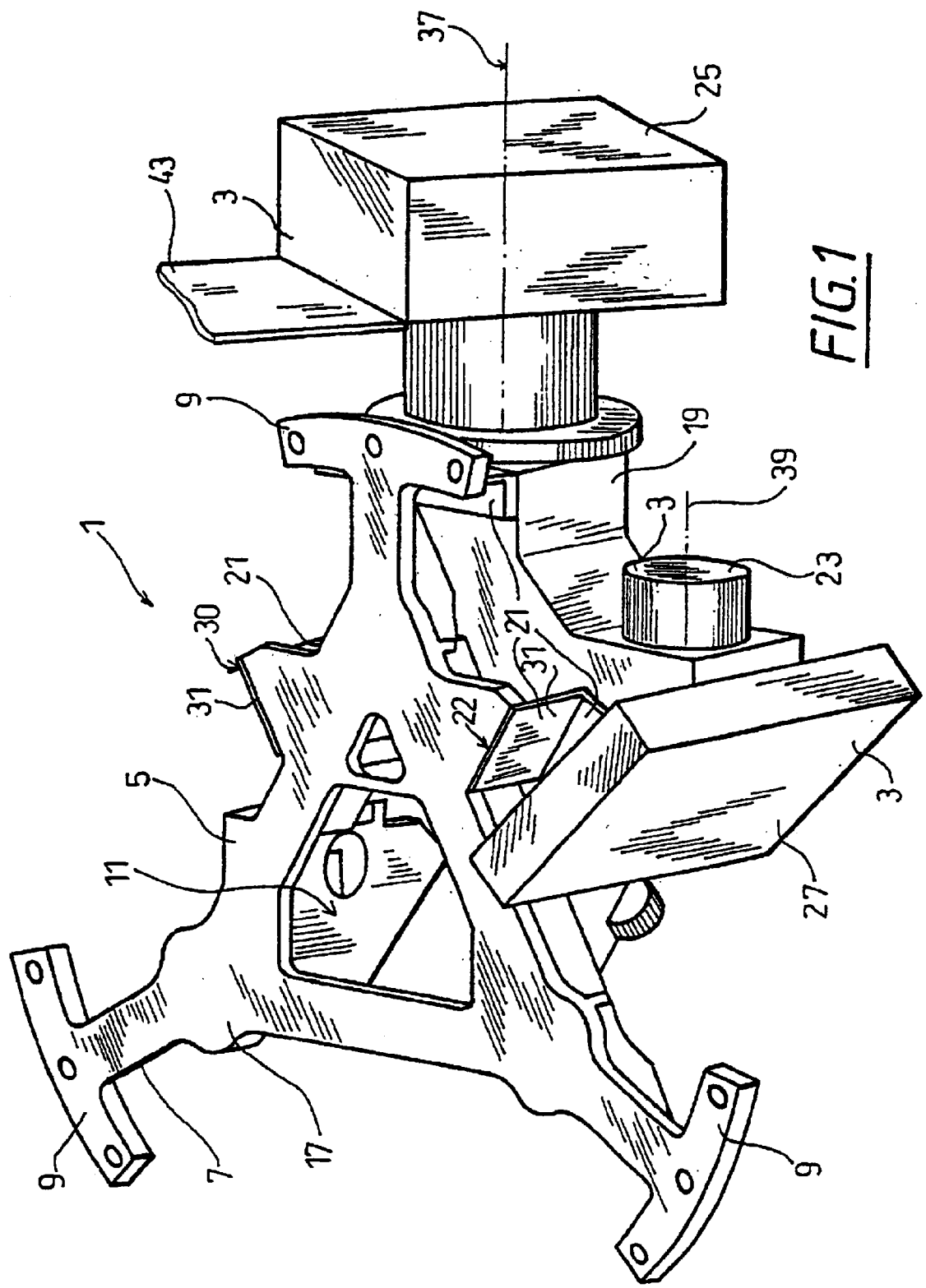
FIG. 1 is a diagram showing an optical bench.
Figure 2:
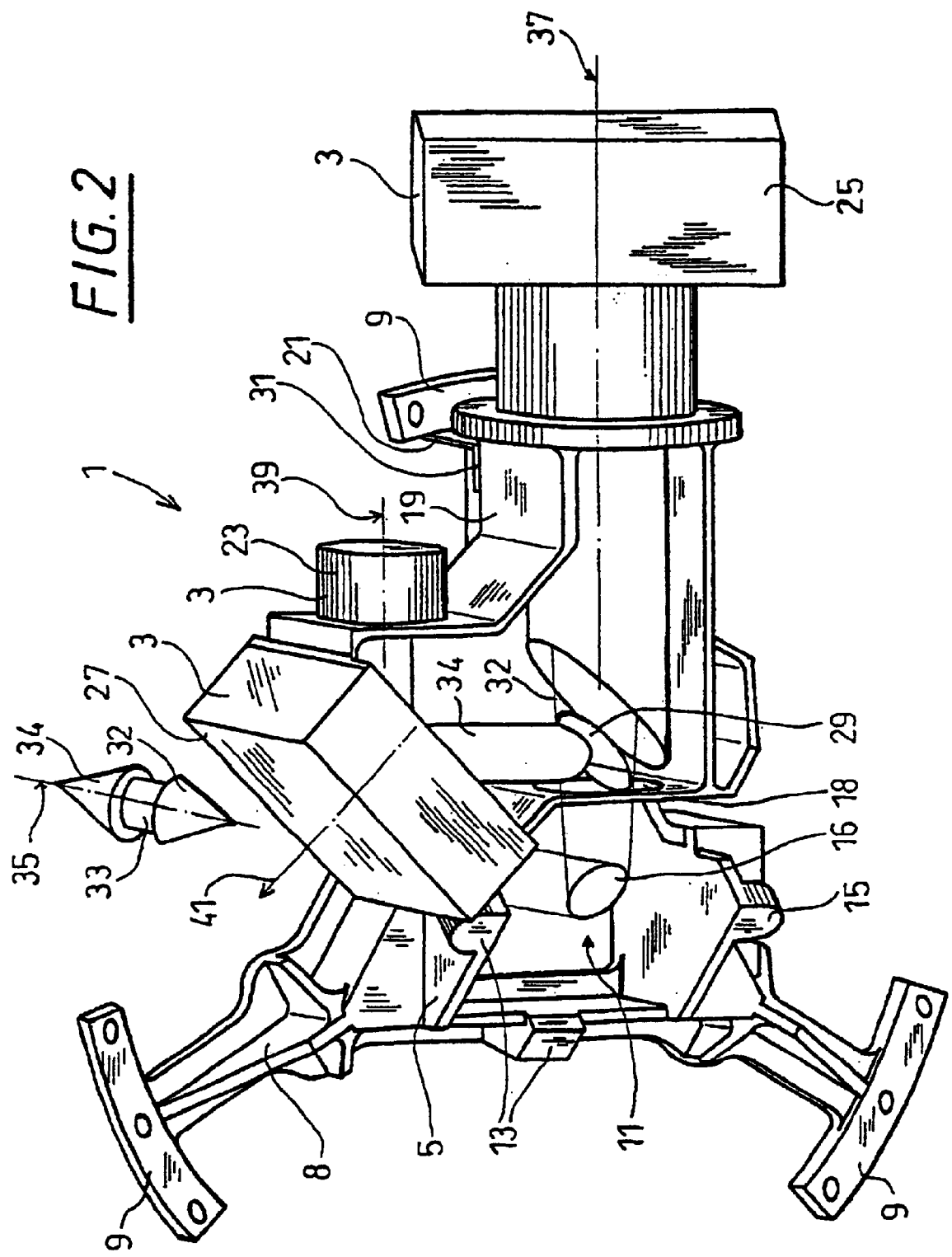
FIG. 2 is a diagram showing the optical bench according to FIG. 1 in a direction turned through 150° and with the seating shown in elevation.

The principal construction of the optical bench shown is described in detail using FIGS. 1 and 2. The optical bench 1 has a baseplate 7 which is provided with reinforcing ribs 8. This baseplate 7 is of triangular shape and has a perforation 11 in the middle. This triangular baseplate 7 is constituted with flange segments at the corners. Furthermore, a connection is constituted with the baseplate 7 for an optical element, here a deflecting mirror which rests on abutment points 13.

A mounting structure 5 is formed by the baseplate 7 with the reinforcing ribs 8 and the connection for an optical element 13. The baseplate 7 has three support points 17 for a telescope. An optical signal can be sent and received by means of the telescope (not shown). The telescope is arranged so that its optical axis 35 runs perpendicularly of the baseplate 7, as shown in FIG. 2. A received signal or a transmitted signal is shown in FIG. 2 by the double arrow 33. The optical axis 35 is likewise drawn in.

A signal received by means of the telescope passes through the perforation 11 and is reflected at a deflecting mirror 16, which is mounted by means of the mounting points 15, in the direction of a seating 19. This seating 19 is constituted as a hollow body and has an aperture 18 for the coupling-ion of the received signal 32. This coupled-in signal is supplied to a receiving unit 25 which has an optical axis 37, and which is firmly secured to the seating. A transmitting unit 23 with an optical axis 39 which is arranged parallel to the optical axis 27 of the receiving unit 25, is likewise secured to the seating 19. The signal emitted by the transmitting unit 23 is first conducted within the seating 19 and is reflected by a deflecting mirror 27 with a surface normal 41 which represents the optical axis of this deflecting mirror 27 to a selectively reflecting mirror 29 arranged in the beam path between the deflecting mirror 16 and the receiving unit 25. This mirror 29 is transparent for the received signal and reflecting for a signal striking the mirror 29 at a right angle to the received signal. Such a selective reflectivity can be provided by different polarizations of the received and transmitted signals which cooperate with a corresponding lattice structure of the selectively reflecting mirror 29. The signal emitted by the transmitting unit 23 thus likewise leaves the seating 19 through the aperture 18. The seating 19 is made of Zerodur, a ceramic material with a high thermal conductivity and a low thermal expansion coefficient. The seating 19 could also be constituted as a monolithic member which only has corresponding internal bores for beam guiding of the received and transmitted signals 32, 34. From the selective mirror 29, the beam path of the transmitted signal corresponds to the beam path of the received signal, so that the transmitted beam is also passed to the telescope by the deflecting mirror 27 through the perforation 11 in the baseplate 9. The baseplate can be secured by means of the flange segments 9 to a superordinate member which is a component of a satellite.

The seating 19 is connected to the baseplate, movably relative to it, by means of angularly constituted springs 30, here in the form of leaf springs. Different deformations of the individual components, particularly those resulting from temperature fluctuations, can be compensated by this relative movability.

Three leaf springs 31 are provided for connecting the seating 19 and the baseplate 7. Furthermore, the seating 19 is connected via a thermally conducting strip 43 to a further component of the satellite. The mounting structure 5, including the baseplate 7, is made of aluminum. Aluminum and Zerodur have different expansion coefficients. Thus the baseplate consequently does not expand due to temperature fluctuations to the same extent as the seating 19. The seating 19 is in its turn constituted as a compact member, and hence is not exposed to such high stresses, and thus the use of a ceramic or Zerodur, a brittle material, is possible. The seating 19 is arranged to be deformable relative to the baseplate 7 by means of the spring elements, so that a relative deformation of the seating 19 and the baseplate 7 results, due to different thermal deformation of the seating 19 and the baseplate 7. Three springs 30 are provided for mounting the seating 19, and have a predetermined cross section 22 for the provision of thermal conduction. This cross section 22 is constituted for limited heat removal from the seating 19. A uniform temperature of the seating 19 can be ensured by means of these heat-insulating connecting elements 21. A temperature gradient, if present, is reduced by this heat accumulation. If the seating 19 exceeds a predetermined temperature, heat is carried away by the heat-conducting strip 43 provided. Internal stresses in the seating 19, from which a distortion could arise in the seating, are prevented by a uniform temperature of the seating 19, so that the system would sensitively react just to those deformations which affect the parallelism of the optical axes 37, 39 of the seating [sic] and transmission unit. For use in space, shape stability is required for the temperature range of about −40° C. to 70° C.

In the case of communication between two satellites, the received and transmitted beams 32, 34 must not deviate from each other. This means that, for example, the axes of the individual optical units should not be changed. In the embodiment example shown, a compact form of construction is attained by means of the seating 19 by which several optical units 3 are seated. In the embodiment example shown, the optical axes 37, 39, 41 of the optical units 3 run parallel to the baseplate 7. It could also be provided to rotate the seating by 90°, so that a plane defined by the optical axes 37, 39, 41 runs perpendicularly to the baseplate 7. It is thus possible to adapt to the available mounting space.

We claim:

1. An optical bench comprising a baseplate that is connected to a seating and can be connected to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the seating (19) comprises a monolithic member with internal bores for beam guiding.

2. The optical bench according to claim 1, wherein the seating (19) is arranged for seating at least two optical units (3).

3. An optical bench comprising a baseplate that is connected to a seating and can be connected to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the seating (19) comprises a housing-like hollow member comprising at least one aperture (18) for coupling optical signals (32, 34) in and out.

4. The optical bench according to claim 3, wherein the seating (19) is arranged for seating at least two optical units (3).

5. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein leaf springs (31) are provided as the connecting elements (21).

6. The optical bench according to claim 5, wherein the seating (19) comprises a monolithic member with internal bores for beam guiding.

7. The optical bench according to claim 5, wherein the seating (19) comprises a housing-like hollow member comprising at least one aperture (18) for coupling optical signals (32, 34) in and out.

8. The optical bench according to claim 5, wherein the seating (19) is arranged for seating at least two optical units (3).

9. The optical bench according to claim 5, wherein the seating (19) is connected to the baseplate (7) by connecting elements (21) that comprise articulations.

10. The optical bench according to claim 5, wherein the seating (19) comprises a material that has a high ratio of thermal conductivity to thermal expansion coefficients.

11. The optical bench according to claim 5, wherein the baseplate (7) comprises a triangular shape, with a perforation (11) arranged centrally and flange segments (9) by means of which the baseplate (7) is firmly securable to an associated component.

12. The optical bench according to claim 5, wherein the baseplate (7) comprises a mounting structure (5) with reinforcements and wherein the baseplate (7) or the mounting structure (5) comprises support points (17) for coupling on a telescope.

13. The optical bench according to claim 5, wherein the connecting elements (21) are heat-insulting and have a predetermined cross section for heat removal depending on their thermal conductivity.

14. The optical bench according to claim 5, wherein the seating (19) is provided with a heat conducting strip (43) by which heat is removed on exceeding a predetermined temperature.

15. The optical bench according to claim 5, wherein a receiving unit (25) and a transmitting unit (23) are firmly secured to the seating (19).

16. The optical bench according to claim 5, wherein the baseplate comprises a mounting structure (5) comprising a connection (13) for an optical unit.

17. The optical bench according to claim 5, wherein the optical bench is shape-stable in the temperature range of −40 through −70° C. required for use in space.

18. The optical bench according to claim 5, wherein the seating is comprised of Zerodur.

19. The optical bench according to claim 5, wherein the baseplate is comprised at least partially of a metal.

20. An optical bench comprising a baseplate that is connected to a seating and connectible to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) that comprise articulations.

21. The optical bench according to claim 20, wherein the seating (19) is arranged for seating at least two optical units (3).

22. The optical bench according to claim 20, wherein the articulations permit a movement of the baseplate relative to the seating only by the action of a predetermined force.

23. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the seating (19) comprises a material that has a high ratio of thermal conductivity to thermal expansion coefficients.

24. The optical bench according to claim 23, wherein the seating (19) is arranged for seating at least two optical units (3).

25. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to a baseplate (7) by connecting elements (21) and wherein the baseplate (7) comprises a triangular shape, with a perforation (11) arranged centrally and flange segments (9) by which the baseplate (7) is firmly secured to an associated component.

26. The optical bench according to claim 25, wherein the seating (19) is arranged for seating at least two optical units (3).

27. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the baseplate (7) comprises a mounting structure (5) with reinforcements and wherein the baseplate (7) or the mounting structure (5) comprises support points (17) for coupling-on a telescope.

28. The optical bench according to claim 27, wherein the seating (19) comprises a monolithic member with internal bores for beam guiding.

29. The optical bench according to claim 27, wherein the seating (19) comprises a housing-like hollow member comprising at least one aperture (18) for coupling optical signals (32, 34) in and out.

30. The optical bench according to claim 27, wherein the seating (19) is arranged for seating at least two optical units (3).

31. The optical bench according to claim 27, wherein the sealing (19) is connected to the baseplate (7) by connecting elements (21) that comprise articulations.

32. The optical bench according to claim 27, wherein the seating (19) comprises a material that has a high ratio of thermal conductivity to thermal expansion coefficients.

33. The optical bench according to claim 27, wherein the baseplate (7) comprises a triangular shape, with a perforation (11) arranged centrally and flange segments (9) by means of which the baseplate (7) is firmly secured to an associated component.

34. The optical bench according to claim 27, wherein the connecting elements (21) are heat-insulating and have a predetermined cross section for heat removal depending on their thermal conductivity.

35. The optical bench according to claim 27, wherein the seating (19) is provided with a heat conducting strip (43) by which heat is removed on exceeding a predetermined temperature.

36. The optical bench according to claim 27, wherein a receiving unit (25) and a transmitting unit (23) are firmly secured to the seating (19).

37. The optical bench according to claim 27, wherein the baseplate comprises a mounting structure (5) comprising a connection (13) for an optical unit.

38. The optical bench according to claim 27, wherein the optical bench is shape-stable in the temperature range of −40 through +70° C. required for use in space.

39. The optical bench according to claim 27, wherein the seating is made of Zerodur.

40. The optical bench according to claim 27, wherein the baseplate is comprised at least partially of a metal.

41. The optical bench according to claim 27, wherein the reinforcement comprise ribs.

42. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) that are heat-insulting and have a predetermined cross section for heat removal depending on their thermal conductivity.

43. The optical bench according to claim 42, wherein the seating (19) is arranged for seating at least two optical units (3).

44. An optical bench comprising a baseplate that is connected to a seating and is connectible to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the seating (19) is provided with a heat conducting strip (43) by which heat is removed on exceeding a predetermined temperature.

45. The optical bench according to claim 44, wherein the seating (19) is arranged for seating at least two optical units (3).

46. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein a receiving unit (25) and a transmitting unit (23) are firmly secured to the seating (19).

47. The optical bench according to claim 46, wherein the seating (19) is arranged for seating at least two optical units (3).

48. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the baseplate comprises a mounting structure (5) comprising a connection (13) for an optical unit.

49. The optical bench according to claim 48, wherein the seating (19) is arranged for seating at least two optical units (3).

50. The optical bench according to claim 48, wherein the connection for an optical unit comprises mounting points (15) for mounting in controllable deflecting mirror.

51. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the optical bench is shape-stable in the temperature range of −40 through +70° C. required for use in space.

52. The optical bench according to claim 51, wherein the seating (19) is arranged for seating at least two optical units (3).

53. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the seating comprises a ceramic material.

54. The optical bench according to claim 53, wherein the seating (19) is arranged for seating at least two optical units (3).

55. An optical bench according to claim 53, wherein the seating comprises Zerodur.

56. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21) and wherein the baseplate is comprised at least partially of a metal.

57. The optical bench according to claim 56, wherein the seating (19) is arranged for seating at least two optical units (3).

58. An optical bench comprising a baseplate that is connected to a seating and is connectable to an associated component, the seating being arranged moveable in its entirety relative to the baseplate in such way that stresses arising in the baseplate are transformed into deformation of the baseplate relative to the seating, wherein the seating (19) comprises a hollow member for beam guiding, and is connected to the baseplate (7) by connecting elements (21), and wherein the seating comprises articulations that permit movement of the baseplate relative to the seating only by action of a predetermined minimum force.

* * * * *

UNITED STATES PATENT AND TRADEMARK OFFICE
CERTIFICATE OF CORRECTION

PATENT NO. : 6,788,476 B2 Page 1 of 1
DATED : March 13, 2002
INVENTOR(S) : Armin Schoppach et al.

It is certified that error appears in the above-identified patent and that said Letters Patent is hereby corrected as shown below:

<u>Title page,</u>
Item [73], Assignee, should read as follows:
-- Carl Zeiss Optronik Gmbh --

Signed and Sealed this

Thirtieth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,788,476 B2
DATED : March 13, 2002
INVENTOR(S) : Armin Schoppach et al.

It is certified that error appears in the above-identified patent and that said Letters Patent is hereby corrected as shown below:

<u>Title page,</u>
Item [73], Assignee, should read as follows:
-- Zeiss Optronik Gmbh --

Signed and Sealed this

Fourth Day of January, 2005

JON W. DUDAS
*Director of the United States Patent and Trademark Office*